United States Patent Office 2,796,271
Patented June 18, 1957

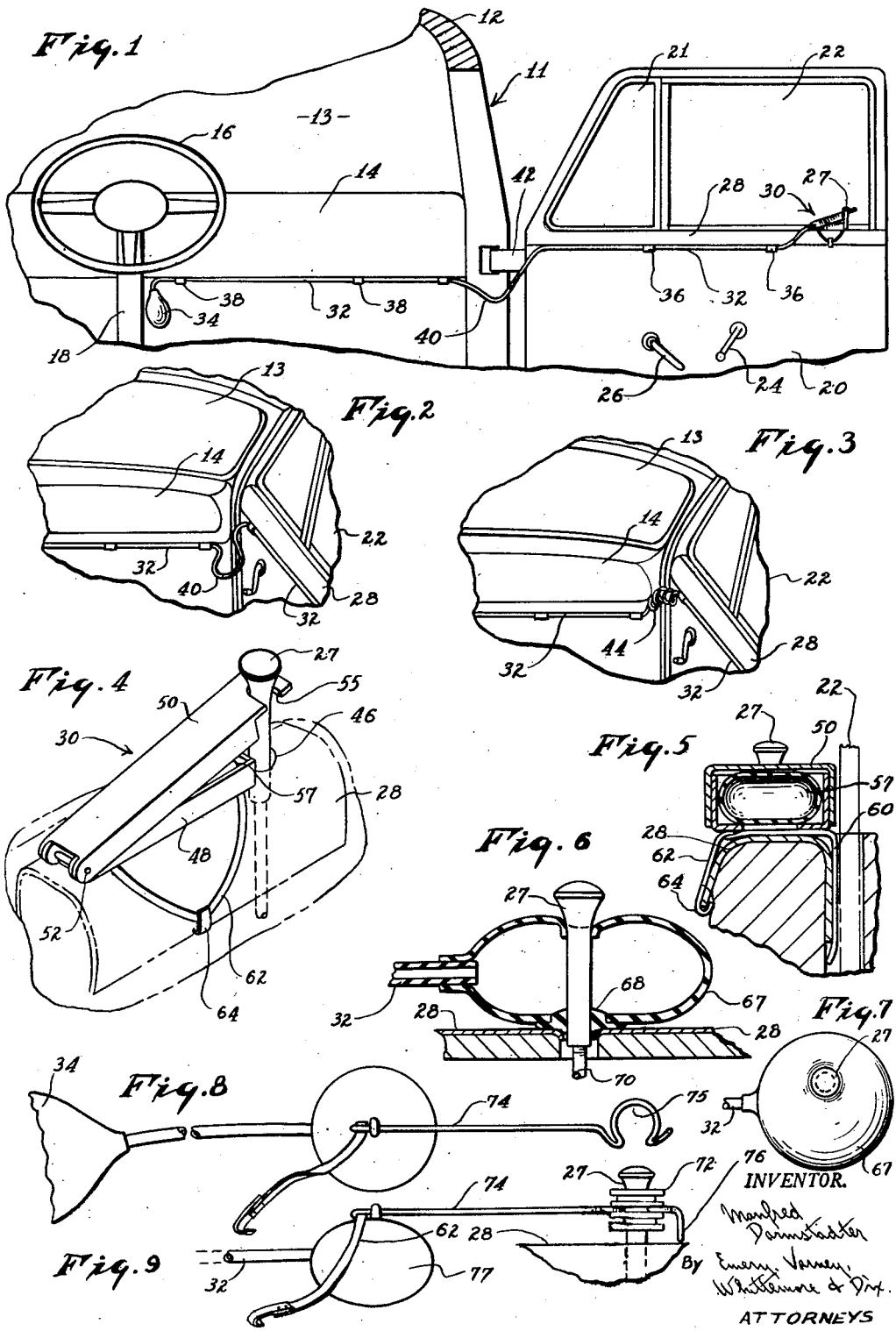

2,796,271

REMOTE CONTROL FOR AUTOMOBILE DOOR LOCK ACTUATOR

Manfred Darmstadter, Summit, N. J.

Application October 12, 1954, Serial No. 461,862

5 Claims. (Cl. 292—1)

This invention relates to apparatus for operating the locks of automobile doors, and more especially to an attachment which can be placed on any standard automobile.

The invention is concerned with doors having lock actuators which extend through a surface of the door, ordinarily the inside sill of the window, and which are operated to lock or unlock the door by pushing the actuator downwardly or lifting it upwardly, respectively. These lock actuators are easily operated manually; but in most automobiles the seats are commonly so wide or so placed that inconvenient stretching or reaching is required to reach some of the actuators from any one position in the car. For example the driver cannot reach the door lock actuator on the opposite side of the car without stretching inconveniently or moving from his place behind the wheel.

It is an object of this invention to provide a very simple and inexpensive attachment which can be used with any automobile having the actuators, for overcoming the inconvenience described; and with this invention the driver of a car or any occupant, can unlock the door on the opposite side or any door or doors not immediately adjacent to an occupant of the car by merely operating a bulb or other air reservoir which is connected by tubing to a bellows on the door. When air is supplied to this bellows, the actuator for the lock is raised either directly or through motion transmitting connections, depending upon the particular embodiment of the invention employed.

Some features of the invention relate to constructions by which the bellows assembly is held on the door of the automobile without requiring any special fastening means or tools for connecting it. It is a feature of the preferred embodiments of the invention that no holes need be drilled in the door of the car or elsewhere, and the attachment can be removed at any time leaving the automobile door and other parts of the car as they were before the attachment was used. The invention automatically adjusts itself for the vertical length of the actuator button.

A flexible tube, for connecting the air reservoir with the actuator-operating bellows, has a loop at the side of the door where the door is hinged to the body of the automobile, and this loop provides the additional length of tube which is needed when the door is swung into open position. The loop need not provide the full additional length of tube because the tube can be made of rubber or other suitable material to provide sufficient stretch to provide part of the additional length. In one embodiment of the invention, the loop consists of several coils of a helix and this prevents the tube from hanging down where it might get in the way of an occupant; but this coiled loop is not essential and it is used only when the device as applied has a hinge providing an extremely wide separation of the inside face of the door from the body of the automobile when the door is in open position.

The invention will be described in connection with a device for unlocking the door, and this is the primary purpose of the invention. However, it will be understood that the device can be made in such a way as to move the lock actuator in the opposite direction to lock the door, and can be made with mechanism for both locking and unlocking the door.

Other objects, features and advantages of the invention will appear or be pointed out as the description proceeds.

In the drawing, forming a part hereof, in which like reference characters indicate corresponding parts in all the views;

Figure 1 is a fragmentary, diagrammatic view showing the driving compartment of an automobile and showing a door on the opposite side from the driver in open position and equipped with the unlocking attachment of this invention;

Figures 2 and 3 are fragmentary views showing the position of the tube when the door is in closed position, these two figures representing different modifications of the invention;

Figure 4 is a greatly enlarged perspective view of the unlocking attachment shown in Figure 1;

Figure 5 is an enlarged sectional view through the structure shown in Figure 4 but with the lever in its lowered position;

Figure 6 is a vertical sectional view through a modified form of the invention;

Figure 7 is a top plan view, on a reduced scale, of the structure shown in Figure 6;

Figure 8 is a top plan view of a second modified form of the invention; and

Figure 9 is a front elevation of a portion of the structure shown in Figure 8.

Figure 1 shows a portion of an automobile body 11 having a roof 12, windshield 13 and dashboard 14. At the driver's side of the car there is a steering wheel 16 at the top of a steering column 18.

The automobile has a door 20, in the upper part of which there is a sectional window including a ventilating section 21 and a main window section 22. The window is raised and lowered in the conventional manner by a crank 24 extending from the inside face of the door 20; and there is a lever 26 for operating the latch of the door in order to open the door.

For locking the door, when in closed position, there is an actuator handle 27 which extends upwardly through a sill 28. The actuator handle 27 is of reduced cross section below its upper end to provide a shoulder for lifting the actuator. This sill 28 is a shoulder on the door 29 along the inside of the slot into which the window 22 moves when the window is lowered. When the actuator handle 27 is pushed down, the door 20 is locked; and when the actuator handle 27 is pulled up, the door is unlocked. The construction thus far described is conventional.

In order to raise the actuator handle 27 by remote control, there is a bellows assembly 30 located adjacent to the actuator handle 27. This bellows assembly 30 is connected with a tube 32 extending to a bulb 34 located near the steering column 18, where it can be conveniently pressed by the driver, or at any other selected location within the automobile for remote control of the door lock actuator by an occupant of the car. The bulb 34 is merely representative of a fluid reservoir which can be manually compressed to force working fluid, preferably air, through the tube 32 to a bellows in the bellows assembly 30.

The portion of the tube 32 which is attached to the door 20, is preferably held in place by spring clips suitably attached to the tube 32, and which can be pushed up under the lower edge of the sill 28. These clips 36 are then held in place by friction against the sill 28 and the face of the door 20. The portion of the tube 32 which extends across the lower end of the dash board 14 is held in place by spring clips 38 which surround the tube and clip over the bottom edge of the dash board 14, or fasten to available holes and/or projections commonly found in automobile construction. Other kinds of fastening means can be used for holding the tube in place.

There is a loop 40 at the side of the door, this door being connected with the body of the automobile by hinges 42, the upper one of which is shown in Figure 1. When the door 20 is swung into closed position, as shown in Figure 2, the loop 40 takes a position inside the door where it is out of the way. If the tube 32 is made of rubber or suitable material which can stretch easily, it is not necessary to have any substantial surplus length of loop 40 because part of the extra length of tube required when the door is open can be obtained by stretching of the tube 32, as previously explained.

For those automobiles which have hinges constructed so that the inside face of the door moves away from the body of the automobile for a great distance when the door is swung open, a helical coil 44 (Figure 3) can be used in place of the loop 40 so as to avoid a long loop which would hang down for a substantial distance below the bottom level of the dashboard.

The actual construction of the bellows assembly of Figure 1 is shown in Figures 4 and 5. The actuator handle 27 extends upwardly through an opening 46 in the top of the sill 28. The bellows assembly includes a housing 48 having a cover 50 which is connected to the housing at one end by a hinge or pivot connection 52. This hinge 52 serves as a fulcrum for the cover 50 which is the actuating lever for the assembly. The cover 50 has a recess 55 near its end remote from the hinge 52, and this recess 55 receives the neck of the actuator handle 27. The upper end of the actuator handle 27 is larger than the recess 55 so that upward movement of the free end of the cover 50 engages the shoulder of the actuator and lifts the actuator handle 27. The recess 55 is made large enough to fit around the stem of the actuator handle below the head and allows sufficient clearance around the actuator handle 27 so as to avoid cramping or binding as the lever 50 moves upward or downward causing the recess 55 to describe a portion of an arc.

A bellows 57 located within the housing 48, expands, when inflated, to raise the cover 50 into the position shown in Figure 4. When the air pressure in the bellows 57 is released, the bellows contract and permit the cover 50 to drop back into its lowered position shown in Fig. 5. If the cover 50 drops by gravity when the bellows contract, then the actuator handle 27 is left in elevated position until someone pushes it down to again lock the door. One side of the recess 55 may bear against the neck of the actuator handle when the actuator handle is in the raised position shown in Figure 4, and in that case the cover 50 may remain up even though the bellows retract. This condition will depend upon the way in which the bellows assembly 30 is positioned on the sill 28 when originally attached, but it makes no difference whether the cover 50 descends by gravity or remains up while the actuator handle 27 is up because the cover 50 is pushed down in any event when the actuator handle 27 is pushed down to lock the door, and there is no occasion to use the bellows assembly 30 again until the door has been locked.

The lower part of the housing 48 rests on the sill 28 and there is a flange 60 (Figure 5) at the inside edge of the housing 48 for extending around the outside of the sill 28. This flange 60, together with the connection of the hook 55 to the actuator handle 27, prevents the housing 48 from moving inwardly and sliding off the sill 28. In order to prevent displacement of the housing 48 outwardly, there is a strap 62 with a hook 64 that engages under the lower inside edge of the sill 28. The strap 62 is preferably made of rubber or other material for imparting some tension to the strap and for making it adaptable to automobiles having sills of different depths and widths.

It will be evident from Figure 4 that the recess 55, which hooks around the actuator handle 27, prevents any endwise movement of the housing 48 on the sill 28. Since the bellows 57 is located between the fulcrum 52 and the actuator handle 27, which comprises the load on the lever, it will be apparent that the pivoted cover 50 serves as a lever for giving to the load a greater displacement than that of the force; that is, the actuator handle 27 is moved further and faster than the top of the bellows 57 which pushes the cover 50 upwardly.

The bellows 57 is shown as a rubber bladder but this is merely representative of bellows generally, and any bellows can be used which will expand when subjected to internal fluid pressure. The bellows may contract when the fluid pressure is released, or it may remain expanded until the actuator handle is pushed down to lock the door. This depends upon the construction of the particular bellows used.

Figure 6 shows a modification of the invention which is simpler than the bellows assembly shown in Figures 4 and 5, and acts directly on the actuator handle without the leverage indicated in Figures 4 and 5. In Figure 6 a bellows 67 is made with a small enough opening for the actuator handle 27 to fit snugly around the neck of the actuator handle. The opening is preferably in a position which throws the larger portion of the bellows body toward the inside of the car, to avoid interference between the bellows and the sliding window of the car. The lower side of the bellows 67 rests on the sill 28 and has a soft sealing section 68, of soft rubber or other sealing material, that bears against the sill and the neck of the actuator handle for preventing any substantial leakage of air as the bellows expand and the actuator handle slides upwardly past the sealing section 68. The bellows 67 press against the shoulder provided by the diverging top portion of the actuator handle 27 with sufficient force to prevent any substantial air leakage at the top of the bellows. When air is supplied to the bellows 67 through the hose 32, the bellows 67 expand upwardly and lift the actuator handle 27. Some leakage of air does no harm since the full volume of air is restored to the reservoir after each operation when the bulb expands to its original size.

When the air pressure in the bellows 67 is released, the bellows shrinks to its smaller size and the actuator handle 27 can be pushed down again whenever it becomes desirable to lock the door. If the upper end of the actuator handle 27 is too large for the bellows 67 to be stretched over it when placing the bellows on the actuator handle, then the actuator handle 27 can be removed from a lock actuator rod 70, which connects the handle 27 with the door locking mechanism. The bellows is placed in position and the actuator handle 27 is pushed downwardly through the opening in the center of the bellows 67 and again connected to the rod 70 by screwing or wedging over the end of the rod, depending upon the particular construction of the automobile door with which the bellows is being assembled.

Figures 8 and 9 show another simplified modification of the invention. In these figures a collar 72 is placed on the actuator handle 27 and this collar 72 has grooves at different heights for adapting the invention to actuator handles which are of different lengths. A lever 74 has a loop portion 75 which fits around the collar 72 in one of the grooves of the collar. The loop portion 75 is preferably made so that it has to be sprung outwardly to some extent in order to fit over the collar 72. This insures a snug fit. The collar 72 is preferably of rubber or other flexible material which flexes to allow for the angular movement, upwards and downwards, of the lever 74.

At the right end of the lever 74, the lever turns downwardly and has a lower end 76 which bears against the sill 28 of the door to provide a fulcrum for the lever 74. At a substantial distance from the actuator 27, there is a bellows 77 attached to the lever 74 and resting on the sill 28. When air is supplied to the bellows 77 through the tube 32, the bellows 77 is expanded and raises the end of the lever 74. This lever rocks about the fulcrum provided by the end portion 77 resting on the sill 28 and as the bellows end of the lever 74 moves upwardly, the collar 72 and actuator handle 27 are lifted. This construction provides a leverage which gains force; that is, the bellows 77 moves the connected end of the lever 74 much further than the lever moves the actuator 27 and this provides a mechanical advantage for the bellows.

One end of the assembly, shown in Figures 8 and 9, is held in position by its engagement with the collar 72 on the actuator handle 27, and the other end is preferably held down against the sill 28 by a flexible strap 62 having a hook 64 which engages under the inner and lower edge of the sill, in the same manner as in Figures 4 and 5. The strap 62 is made of resilient material so that it can stretch or flex to permit the bellows 77 to expand upwardly when the actuator handle 27 is to be raised to unlock the door.

The preferred embodiment and some modifications of the invention have been illustrated and described. Terms of orientation in the description and claims are relative, and changes and other modifications can be made, and some features can be used in different combinations without departing from the invention as defined in the claims.

What is claimed is:

1. Apparatus for unlocking an automobile door of the class which has an actuator extending upwardly through a window sill of the automobile door, which actuator is depressed to lock the door and raised to unlock the door, said apparatus comprising a bellows located adjacent to the actuator and above the sill, a lever operated by the bellows, a hook at one end of the lever in position to engage behind the actuator of the door for holding that end of the lever in place, and means for holding the other end of the lever in place including detachable fastening means for engaging a portion of the door for holding that end of the lever in position on the door.

2. The apparatus described in claim 1 and in which the bellows and lever assembly is held on the door by a strap with a hook that engages under the lower end of the sill and a flange that engages behind the outside upper edge of the sill.

3. Apparatus for operating an automobile door lock actuator which extends through an opening in a window sill of the automobile door, said apparatus comprising a housing that rests on the sill, a bellows enclosed within the housing, the housing having a cover at its upper end and a hinge at one end of the cover connecting the cover to the portion of the housing beneath it, means at the other end of the cover for connecting the cover with the lock actuator, tubing leading from the bellows to a remote location, and a compressible reservoir at the remote location for supplying working fluid to the bellows.

4. An attachment for an automobile door of the class wherein the door is hollow and has a chamber enclosed therein between an outer vertical wall of the door and an inner wall of the door extending substantially vertically throughout most of its area and then horizontally toward the outer wall to form a window sill at the upper end of said chamber, and there is locking mechanism for the door enclosed within the chamber, and an actuator for the locking mechanism extending upwardly through an opening in the window sill, the actuator being movable with respect to the window sill between two different positions selectively to release or lock said locking mechanism, said attachment comprising an actuator operator embracing the actuator above the sill, said operator being located on the side of the inner wall remote from said chamber and being supported by said inner wall and at least partially located between said inside wall and a shoulder of the actuator, and said operator including a bellows in position to shift the actuator from one of its positions to the other by inflation of the bellows to thrust the actuator upwardly while the operator reacts against said inside wall, tubing leading from the bellows to a remote location, and a compressible reservoir connected to the other end of the tubing at the remote location and within convenient reach of the driver of the automobile for supplying working fluid to the bellows.

5. The automobile door attachment described in claim 4, and in which the bellows is annular and surrounds the actuator, the opening at the center of the annulus being smaller than the shoulder of the actuator and the bellows substantially filling the space between said shoulder and the window sill when the bellows is at least partially retracted and the actuator is in a lowered position.

References Cited in the file of this patent

UNITED STATES PATENTS

| | | |
|---|---|---|
| 348,868 | Straube | Sept. 7, 1886 |
| 1,459,317 | Birdsall | June 19, 1923 |
| 1,488,121 | Johnson | Mar. 25, 1924 |
| 1,508,418 | Stewart | Sept. 16, 1924 |
| 2,228,674 | Raymond | Jan. 14, 1941 |
| 2,299,646 | Muller | Oct. 20, 1942 |
| 2,340,722 | Wiederhold | Feb. 1, 1944 |